(12) United States Patent
Currle

(10) Patent No.: US 11,787,266 B2
(45) Date of Patent: Oct. 17, 2023

(54) VEHICLE AIR-CONDITIONING SYSTEM FOR VENTILATING A VEHICLE INTERIOR COMPARTMENT

(71) Applicant: Daimler AG, Stuttgart (DE)

(72) Inventor: Joachim Currle, Stuttgart (DE)

(73) Assignee: Daimler AG, Stuttgart (DE)

( * ) Notice: Subject to any disclaimer, the term of this patent is extended or adjusted under 35 U.S.C. 154(b) by 23 days.

(21) Appl. No.: 16/463,749

(22) PCT Filed: Oct. 26, 2017

(86) PCT No.: PCT/EP2017/001259
§ 371 (c)(1),
(2) Date: May 23, 2019

(87) PCT Pub. No.: WO2018/095557
PCT Pub. Date: May 31, 2018

(65) Prior Publication Data
US 2019/0381863 A1 Dec. 19, 2019

(30) Foreign Application Priority Data

Nov. 24, 2016 (DE) ...................... 10 2016 014 028.3

(51) Int. Cl.
*B60H 1/24* (2006.01)
*B60H 1/00* (2006.01)

(52) U.S. Cl.
CPC ............. *B60H 1/248* (2013.01); *B60H 1/008* (2013.01); *B60H 1/00849* (2013.01)

(58) Field of Classification Search
CPC .... B60H 1/248; B60H 1/008; B60H 1/00849; B60H 1/00857; B60H 1/00864
USPC .............................................. 454/70; 700/276
See application file for complete search history.

(56) References Cited

U.S. PATENT DOCUMENTS 3,911,801 A * 10/1975 Stolz ...................... B60H 1/248
454/165
4,913,347 A 4/1990 Burst et al.
5,152,335 A * 10/1992 Doi .................... B60H 1/00842
165/204

(Continued)

FOREIGN PATENT DOCUMENTS

CN 1503745 A 6/2004
CN 101722816 A 6/2010

(Continued)

OTHER PUBLICATIONS

Translation of the IDS provided document DE 202007002768U1.*

(Continued)

*Primary Examiner* — Edelmira Bosques
*Assistant Examiner* — Frances F. Hamilton
(74) *Attorney, Agent, or Firm* — Crowell & Moring LLP

(57) ABSTRACT

A system for ventilating a vehicle interior compartment operates, at least intermittently, to set an air quality mode in which fresh air and/or circulated air is supplied to the vehicle interior compartment, and to control an interior compartment pressure in the vehicle interior compartment through variation of the flow resistance of an interior compartment ventilation device in an open-loop and/or a closed-loop manner such that the interior compartment pressure is higher than an ambient pressure outside the vehicle interior compartment.

4 Claims, 2 Drawing Sheets

(56) References Cited

U.S. PATENT DOCUMENTS

| | | | | |
|---|---|---|---|---|
| 5,647,793 | A * | 7/1997 | Mariaux | B61D 27/0009 |
| | | | | 454/103 |
| 5,980,378 | A * | 11/1999 | Wieszt | G01N 33/004 |
| | | | | 454/75 |
| 6,497,275 | B1 * | 12/2002 | Elliot | B60H 1/246 |
| | | | | 165/204 |
| 6,758,739 | B1 * | 7/2004 | Sangwan | B60H 3/0085 |
| | | | | 454/75 |
| 8,092,285 | B2 * | 1/2012 | Mathur | B60H 1/00764 |
| | | | | 454/75 |
| 9,676,250 | B2 * | 6/2017 | Weast | B60H 1/00842 |
| 11,230,162 | B2 * | 1/2022 | Seiferlein | B60H 1/008 |
| 2004/0152408 | A1 * | 8/2004 | Eckhardt | B60H 1/00742 |
| | | | | 454/99 |
| 2004/0259493 | A1 * | 12/2004 | Valley | B60H 1/248 |
| | | | | 454/164 |
| 2008/0014856 | A1 | 1/2008 | Voit et al. | |
| 2011/0201263 | A1 | 8/2011 | Srinivasan et al. | |
| 2014/0273786 | A1 * | 9/2014 | Wade | B60H 1/00735 |
| | | | | 454/75 |
| 2015/0032266 | A1 * | 1/2015 | Weast | B60H 1/00842 |
| | | | | 700/276 |
| 2016/0116177 | A1 * | 4/2016 | Sikora | F24F 11/30 |
| | | | | 165/11.2 |
| 2016/0229257 | A1 * | 8/2016 | Yerke | B60H 1/008 |

FOREIGN PATENT DOCUMENTS

| | | |
|---|---|---|
| CN | 102224028 A | 10/2011 |
| DE | 25 32 699 A1 | 2/1977 |
| DE | 36 01 853 A1 | 8/1987 |
| DE | 101 14 524 A1 | 10/2002 |
| DE | 102 44 392 A1 | 4/2004 |
| DE | 103 20 745 A1 | 12/2004 |
| DE | 103 55 893 B3 | 2/2005 |
| DE | 10 2006 053 264 A1 | 5/2008 |
| DE | 202007002768 U1 * | 7/2008 ......... B60H 1/00849 |
| DE | 20 2007 002 768 U1 | 8/2008 |
| DE | 10 2013 109 068 A1 | 2/2015 |
| DE | 10 2013 014 359 A1 | 3/2015 |
| DE | 10 2014 018 299 A1 | 6/2016 |
| DE | 10 2016 101 578 A1 | 8/2016 |
| DE | 102015223513 A1 * | 6/2017 ............. B60H 1/248 |
| EP | 1 406 048 A2 | 4/2004 |

OTHER PUBLICATIONS

Machine Translation of Liebherr (Year: 2008).*
PCT/EP2017/001259, International Search Report dated Jan. 26, 2018 (Three (3) pages).
Chinese-language Office Action issued in Chinese Application No. 201780072153.9 dated Nov. 30, 2021 with partial English translation (13 pages).
Chinese-language Office Action issued in Chinese Application No. 201780072153.9 dated May 25, 2022 with partial English translation (16 pages).
Chinese-language Office Action issued in Chinese Application No. 201780072153.9 dated Aug. 23, 2022 with English translation (13 pages).

* cited by examiner

VEHICLE AIR-CONDITIONING SYSTEM FOR VENTILATING A VEHICLE INTERIOR COMPARTMENT

BACKGROUND AND SUMMARY OF THE INVENTION

The present invention relates to a method for ventilation of a vehicle interior and to a vehicle air-conditioning system for ventilating a vehicle interior, comprising a fan for propelling fresh air or recirculated air, comprising a filter device for filtering and purifying at least the fresh air, and comprising an interior ventilation device for conducting air out of the vehicle interior.

In order to achieve high air quality in vehicle interiors, filter devices are used for filtering and purifying at least the fresh air supplied to the vehicle interior. However, vehicle interiors are not typically hermetically sealed, meaning that leakage points occur, for example at door seals, through which unfiltered air could enter the vehicle interior. In order to be able to maintain an optimum air quality, for example to reduce germ levels in the vehicle interior, the pressure in the vehicle interior would therefore have to be greater than the pressure outside the vehicle interior. In such a case, the leakages would result in an airflow from the inside to the outside and therefore no contaminants would enter the vehicle interior.

It is known from EP 1 406 048 A2, for example, to increase the output of the fan in order achieve an increased pressure in the interior. In this case, it is only possible to increase the pressure in the interior in a fresh air mode. In the recirculation mode, which is preferably used for preventing air pollution in the vehicle interior, such a pressure increase cannot be achieved.

It is known from DE 10 2014 018 299 A1 to adapt the flow cross section of an interior ventilation device at the factory in such a way that a slight overpressure can be achieved in the vehicle interior by supplying fresh air. Nevertheless, the vehicle interior pressure varies depending on the fan output, including in the embodiment according to DE 10 2014 018 209 A1.

It is also known from DE 10 2013 109 068 A1 to arrange a ventilation flap in the flow path of an interior ventilation device, which flap opens and closes depending on the vehicle interior pressure. This is intended to prevent the unfiltered outside air from flowing back through the interior ventilation device in the event of an underpressure in the vehicle interior. DE 10 2013 109 068 A1 does not disclose an option for increasing pressure by means of the ventilation flap.

Furthermore, DE 10 2006 053 264 A1 discloses a method for controlling a dynamic pressure flap, in particular a fresh air flap or a fresh air/recirculated air flap, of a ventilation device of a motor vehicle. In this case, a position of the dynamic pressure flap is controlled on the basis of a traveling speed of the motor vehicle in order to compensate for the dynamic pressure effect at the air inlet.

The object of the present invention is to provide an improved embodiment or at least another embodiment of a method or of a vehicle air-conditioning system for ventilation of a vehicle interior, which embodiment is characterized in particular by the possibility of increasing the pressure in the vehicle interior in a manner that is largely independent of the amount of fresh air supplied.

The invention uses the knowledge of controlling the flow resistance of an interior ventilation device in an open and/or closed-loop manner in order to achieve an overpressure in the vehicle interior relative to the environment. Therefore, according to the invention, an air quality mode is implemented at least temporarily, in which fresh air and recirculated air is supplied to the vehicle interior and in which an interior pressure in the vehicle interior is controlled in an open and/or closed loop manner, by varying the flow resistance of an interior ventilation device for conducting air out of the vehicle interior, in such a way that the interior pressure is greater than an ambient pressure outside the vehicle interior. By influencing the flow resistance of the interior ventilation device, the interior pressure can be adjusted virtually independently of the supply of fresh air into the interior. As a result, it is also possible, in the case of a mixed-air operation in which recirculated air and fresh air are supplied to the interior, to achieve an interior pressure that is greater than the ambient pressure, even at low fan outputs. This allows particularly good air quality in the vehicle interior to be achieved without causing excessive or disturbing noise levels on account of high fan output. Supplying a small amount of fresh air is sufficient to increase the interior pressure. This can also reduce the load placed on the filter. Additionally, provided that the recirculated air is also filtered again before being supplied back to the vehicle interior, even cleaner air in the vehicle interior can be achieved. Furthermore, rapid cooling or heating of the vehicle interior can be achieved by means of a high proportion of recirculated air, it being possible nevertheless to achieve an increased interior pressure by means of the embodiment according to the invention.

One favorable possibility is that the flow resistance of the interior ventilation device is varied by controlling a final control element which is arranged in a flow path of the interior ventilation device. The final control element therefore provides a simple possibility to influence the interior pressure.

Another favorable possibility is that, in order to control the final control element, the final control element is mechanically coupled to a fresh air/recirculated air flap. The higher the proportion of fresh air, the further the final control element can be opened. The lower the proportion of fresh air, i.e., the amount of fresh air supplied in comparison with recirculated air, the further the final control element has to be closed in order to achieve an increase in the interior pressure. Therefore, a simple mechanical coupling device between the final control element and the fresh air/recirculated air flap can be sufficient to achieve the desired increase in the interior pressure above the ambient pressure.

A particularly favorable possibility is that, in order to control the final control element, an actuator for actuating the final control element is used, which actuator is controlled by a control device. By actuating the final control element by means of an actuator, the control device, taking into account the position of the fresh air/recirculated air flap and the fan output, can adjust the final control element such that the desired interior pressure is achieved. Alternatively or additionally, by means of the position of the final control element, the control device can also control the interior pressure in a closed-loop manner so as to be at the desired target pressure or target pressure range.

Another particularly favorable possibility is that, in order to control the final control element, an output change of the fan is used, the fan output of the fan being increased for a short time above a closing threshold in order to close the final control element, and the fan output of the fan being reduced for a short time below an opening threshold in order to open the final control element. As a result, the final control element can be controlled in an open-loop manner without the use of an additional actuator or a mechanical coupling device. Therefore, the final control element can be actuated solely by adapting the ventilation control, such that a very cost-effective implementation of the inventive concept is achieved.

One advantageous solution is that of starting and stopping the air quality mode by means of a manually actuatable operating element. This allows the vehicle driver to start and stop the air quality mode according to their requirements. For example, the air quality mode may be started and stopped manually by actuating a mode selector switch.

A further advantageous solution is that of starting and stopping the air quality mode automatically. By automatically activating and terminating the air quality mode, the air quality mode may be activated before the vehicle driver notices a deterioration in air quality in the vehicle interior.

In one advantageous variant, the air quality mode is started and stopped automatically depending on the outside air quality. This allows the air quality mode to be activated before any contamination of the vehicle interior occurs. In this way, the air quality in the vehicle interior can be improved overall.

In a further advantageous variant, the outside air quality is measured by means of an air quality sensor and/or retrieved from a stationary measurement station and/or determined from weather forecasts. Such an air quality sensor may be arranged on the vehicle, for example. Alternatively, the air quality sensor may be arranged independently of the vehicle, for example in a weather station. The air quality sensor measures in particular the particle density of the particulate pollution, germ levels, pollutants such as ozone, $CO_2$ and nitrogen oxides and/or the oxygen content of the outside air. Air pollution, in particular ozone pollution and particulate pollution, are dependent on the weather, which means that certain predictions about air quality can be made on the basis of the weather forecast.

In order to carry out the above-described method, the invention also uses the knowledge of providing a vehicle air-conditioning system for ventilating a vehicle interior, comprising a fan for propelling fresh air or recirculated air, comprising a filter device for filtering and purifying at least the fresh air, and comprising an interior ventilation device for conducting air out of the vehicle interior. According to the invention, the interior ventilation device has a final control element that can be controlled in an open and/or closed-loop manner and by means of which a flow resistance of the interior ventilation device can be influenced, and the vehicle air-conditioning system is designed such that the vehicle air-conditioning system carries out a method according to the foregoing description. Therefore, the advantages of the method are transferred to the vehicle air-conditioning system, to the above description of which reference is made in this respect.

One advantageous possibility is that the vehicle air-conditioning system has a pressure sensor that measures an interior pressure in the vehicle interior, and that the vehicle air-conditioning system has a control device that controls the final control element in order to control the interior pressure in a closed-loop manner so as to be in a target pressure range. By controlling the interior pressure in a closed-loop manner, the interior pressure can be brought within the target pressure range irrespective of the fan output and of the proportion of fresh air or recirculated air, and therefore a slight overpressure is achieved, meaning that no unfiltered outside air can enter the vehicle interior.

Another advantageous possibility is that the vehicle air-conditioning system has a mode selector switch. Using the mode selector switch, the air quality mode may be started and stopped. The vehicle driver may therefore activate and stop the air quality mode as desired.

One favorable solution is that the vehicle air-conditioning system has an air quality sensor for measuring the outside air quality. The data from the air quality sensor is then preferably used to decide whether the air quality mode is started or stopped.

One particularly favorable solution is that the vehicle air-conditioning system has a communication module via which data on the outside air quality can be received. For example, data from a weather station can be retrieved. Alternatively, forecast data from the weather report can also be evaluated in order to deduce the air quality of the outside air. This also allows the air quality mode to be started and stopped automatically.

One advantageous variant is that the vehicle air-conditioning system has a controllable actuator which actuates the final control element. The position of the final control element can therefore also be influenced by means of a control device. The interior pressure can therefore be easily controlled in an open and/or closed-loop manner.

One expedient possibility is that the vehicle air-conditioning system has a fresh air/recirculated air flap and a coupling device by means of which a movement of the fresh air/recirculated air flap and a movement of the final control element are coupled. Since, in order to achieve an overpressure in the interior, the position of the final control element is dependent on the fresh air supplied to the vehicle interior, a simple and cost-effective control of the final control element can be achieved by means of the mechanical coupling device.

One expedient variant is that the final control element is designed such that the final control element opens and closes on the basis of a pressure difference applied to the final control element, the final control element closing in the case of a pressure difference below a lower pressure difference limit and above an upper pressure difference limit and opening in the case of a pressure difference in a range between the lower pressure difference limit and the upper pressure difference limit. As a result, the final control element can be switched by increasing the fan output or reducing the fan output for a short time. Therefore, by simply controlling the fan, the air quality mode can be activated and deactivated.

Further advantages can be seen from the following description of the drawings. Embodiments of the invention are shown in the drawings. The drawings, the description and the claims contain numerous features in combination. A person skilled in the art will expediently also consider the features individually and combine them to produce appropriate further combinations.

DETAILED DESCRIPTION OF THE DRAWINGS

Figure 1:
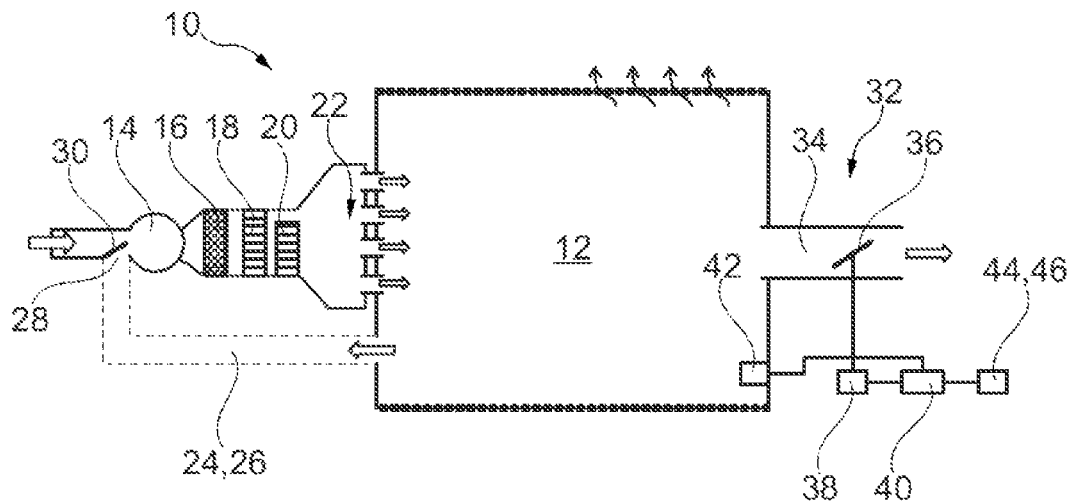
FIG. 1 is a schematic diagram of a vehicle air-conditioning system according to the invention for carrying out the method according to the invention.
Figures 2, 3:
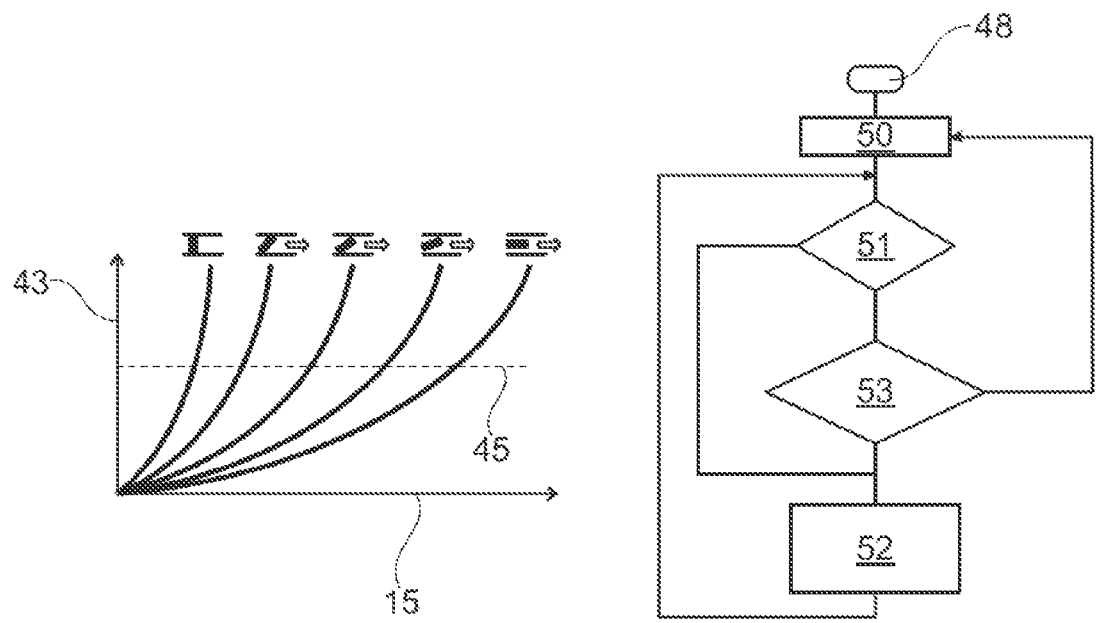
FIG. 2 is a graph in which the interior pressure achieved is shown as a function of the fan output in various positions of the final control element.
FIG. 3 is a flowchart of the method according to the invention.

A first embodiment of a vehicle air-conditioning system 10, shown in FIGS. 1 to 3, is used for ventilating, and in particular for air-conditioning, i.e., heating and cooling, a vehicle interior 12. The vehicle air-conditioning system 10 has a fan 14, a filter device 16, an evaporator 18 for cooling air that is supplied to the vehicle interior 12, and a heating heat exchanger 20 for heating the air that is supplied to the vehicle interior 12. The vehicle air-conditioning system 10 also has a plurality of supply air ducts 22 through which the air propelled by the fan 14 is supplied to the vehicle interior 12. Finally, the vehicle air-conditioning system 10 has a recirculated air guide 24 comprising a recirculated air duct 26, which leads out from the vehicle interior 12 to a supply point 28 which is arranged upstream of the fan 14. At the supply point 28 a fresh air/recirculated air flap 30 is arranged which can open and close the recirculated air duct 26 at the supply point 28 and therefore the ratio between fresh air and recirculated air that is supplied to the interior 12 can be adjusted.

Furthermore, the vehicle air-conditioning system 10 has an interior ventilation device 32 through which air can flow from the interior 12 into the surroundings. For this purpose, the interior ventilation device 32 has a ventilation duct 34 which connects the interior 12 to the surroundings. The ventilation duct 34 has a flow resistance. As a result of this flow resistance, the interior pressure 43 in the vehicle interior 12 increases when a fan output 15 of the fan 14 is increased and thus more fresh air is supplied to the vehicle interior 12.

In the ventilation duct 34 a final control element 36 is arranged which can control the flow resistance of the interior ventilation device 32. Therefore, the interior pressure 43 set in the vehicle interior 12 can be influenced by means of the final control element 36.

The vehicle air-conditioning system 10 also has an actuator 38 by means of which the final control element 36 can be actuated and/or controlled or adjusted. A control device 40 is also provided, by means of which the actuator can be controlled and thus the final control element 36 can be controlled.

In the region of the vehicle interior 12 a pressure sensor 42 is arranged which can measure the interior pressure 43 in the vehicle interior 12. Preferably, a pressure sensor that can measure the outside pressure outside the vehicle interior 12 is also provided.

Preferably, an air quality sensor 44 that can measure the air quality of the outside air outside the vehicle interior 12 is provided. The air quality sensor 44 is designed, for example, such that it measures various quality features of the air. These include, for example, oxygen content, $CO_2$ content, pollutant content such as nitrogen oxides or ozone, dust levels, in particular particulate matter pollution or the like.

Alternatively or additionally, the vehicle air-conditioning system 10 has a communication module 46 by means of which data on the outside air quality can be received.

Furthermore, alternatively or additionally, an operating element, in particular a mode selector switch, can be provided via which an air quality mode 52 of the vehicle air-conditioning system 10 can be started and stopped manually.

The vehicle air-conditioning system 10 may now adjust the air quality mode 52. In the air quality mode 52, an interior pressure 43 in the vehicle interior 12 is increased such that the interior pressure 43 is greater than the pressure outside the vehicle interior 12. This can prevent unfiltered outside air from being able to enter the vehicle interior via leaks. The increase in the interior pressure 43 in the vehicle interior 12 can be substantially achieved by means of the position of the final control element 36. In this way, an optimal interior pressure 43 can be set virtually independently of the fan output 15 and the ratio between fresh air and recirculated air. For the air quality mode 52, it is advantageous for as little outside air as possible to be supplied to the vehicle interior 12 since in this way the filter device 16 is subjected to less load from polluted outside air. Instead, a large proportion of already filtered recirculated air is filtered again, thus achieving a higher degree of purity in the air supplied to the vehicle interior 12. By using the final control element 36, the noise can therefore also be reduced because, even with a lower fan output 15 of the fan 14, a sufficient overpressure in the vehicle interior 12 can be achieved. Moreover, the proportion of fresh air can be reduced such that the load placed on the filter of the filter device 16 is reduced and at the same time the air quality in the vehicle interior 12 can be improved. Furthermore, a highly energy-efficient operation of the vehicle air-conditioning system 10 is achieved in the air quality mode 52 on account of the high proportion of already conditioned recirculated air.

In the operation of the vehicle air-conditioning system 10, the start 48 of the vehicle air-conditioning system 10 takes place initially. Thereupon, a standard operation 50 is activated initially. Thereupon, a test 51 takes place as to whether the mode selector switch has been manually actuated. Depending on the result, either the air quality mode 52 is started directly or an additional test 53 is carried out to check whether the level of outside air pollution is greater than a limit value. If the level of outside air pollution is greater than the limit value, the air quality mode 52 is automatically activated; otherwise, the vehicle air-conditioning system 10 remains in standard operation 50.

It is understood that in the air quality mode 52, the ratio between fresh air and recirculated air and the fan output 15 can be additionally adjusted depending on environmental and vehicle parameters.

The pressure increase in the vehicle interior 12 can be achieved by adjusting the final control element 36, as shown in FIG. 2 for example. In FIG. 2, the interior pressure 43 is plotted against the fan output 15. The various curves symbolize different positions of the final control element 36, the steepest curve corresponding to a closed final control element and the flattest curve corresponding to a fully open final control element 36. It can be clearly seen from FIG. 2 that by varying the degree to which the final control element 36 is opened, a constant interior pressure 43 can be achieved over a wide range of the fan output 15.

Preferably, the control device 40 is connected to the actuator 38, to the pressure sensor 42 and to the air quality sensor 44 and the operating element. By virtue of the control device 40 being able to receive data from the pressure sensor 42, the control device 40, by means of the position of the final control element 36, can control the interior pressure 43 in a closed-loop manner so as to bring it to a desired target pressure or target pressure range 45. As a result, the interior pressure 43 in the vehicle interior 12 can also be kept in the target pressure range 45 for different fan outputs 15 and different proportions of recirculated air, meaning that no unfiltered outside air can enter the vehicle interior via leaks.

Figure 4:
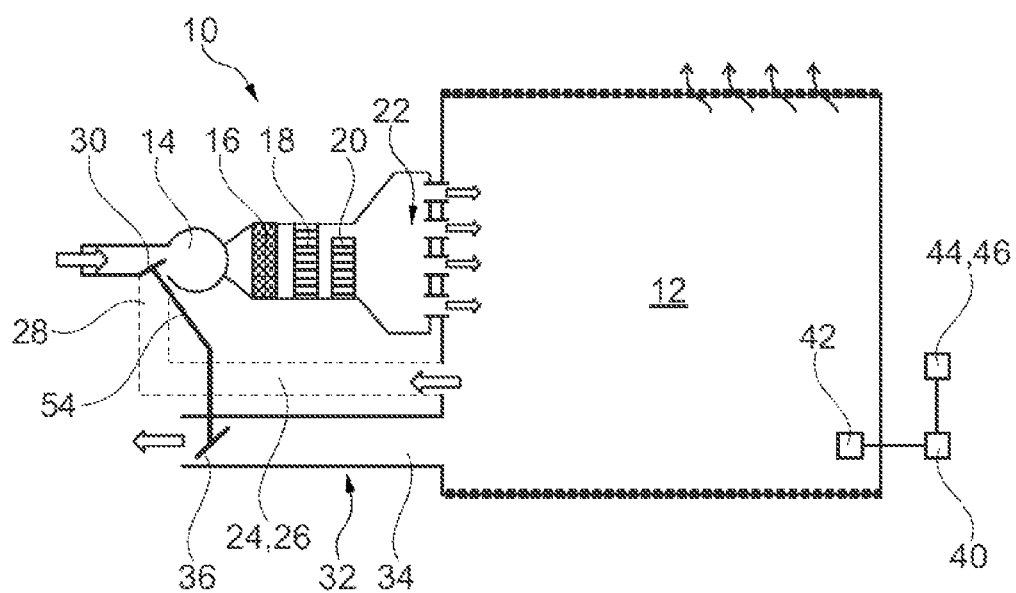
FIG. 4 is a schematic diagram of a second embodiment of the vehicle air-conditioning system.

A second embodiment of the vehicle air-conditioning system 10 (shown in FIG. 4) differs from the first embodiment of the vehicle air-conditioning system 10 (shown in FIGS. 1 to 3) in that a mechanical coupling device 54 of the final control element 36 is provided together with the fresh air/recirculated air flap 30. As a result, a very simple design of the vehicle air-conditioning system 10 is achieved since the actuator 38 can therefore be dispensed with.

The coupling device 54 between the fresh air/recirculated air flap 30 and the final control element 36 is designed such that, if a high proportion of fresh air is set, the final control element 36 is opened and, if a low proportion of fresh air is set, i.e., a high proportion of recirculated air via the fresh air/recirculated air flap 30, the final control element 36 is moved toward a closed position. The greater the flow of fresh air into the vehicle interior 12, the further the final control element 36 may be opened. Accordingly, the lower the flow of fresh air in the vehicle interior 12, the further the final control element 36 has to be closed. This can be carried out directly by means of the mechanical coupling device 54 between the fresh air/recirculated air flap 30 and the final control element 36.

Apart from that, the second embodiment of the vehicle air-conditioning system 10 (shown in FIG. 4) corresponds to the first embodiment of the vehicle air-conditioning system 10 (shown in FIGS. 1 to 3) in terms of design and function, to the above description of which reference is made in this respect.

A third embodiment of the vehicle air-conditioning system 10 (shown in FIGS. 5 to 7) differs from the first embodiment of the vehicle air-conditioning system 10 (shown in FIGS. 1 to 3) in that the final control element 36 is a self-controlled valve 55. This means that the airflow from the vehicle interior 12, which airflow is controlled by the final control element 36, controls the final control element 36 itself; more particularly, the final control element is controlled by a pressure difference applied to the final control element.

The valve 55 has an inlet 64, an outlet 66, a valve body 56, a first valve seat 58, a second valve seat 62 and a spring element 60. The valve body 56 is situated between the first valve seat 58 and the second valve seat 62 and can abut the first valve seat 58, the second valve seat 62 or neither of the two valve seats 58, 62. The spring element 60 preloads the valve body 56 against the first valve seat 58 such that in a rest position without external forces the valve body 56 abuts the first valve seat 58. The first valve seat 58 in this case is associated with the inlet 64 and the second valve seat 62 is associated with the outlet 66.

Figures 5, 6, 7:
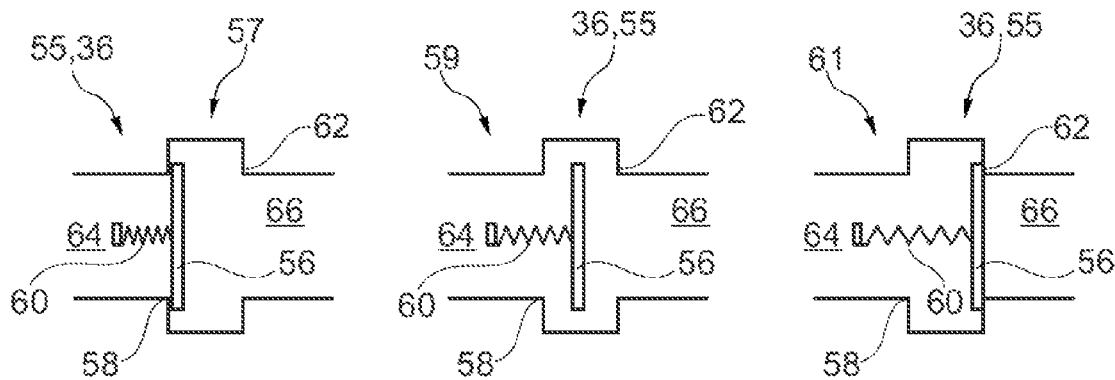
FIG. 5 is a schematic diagram of a final control element according to a third embodiment in a first closed position.
FIG. 6 is a schematic diagram of the final control element of FIG. 5 in an intermediate position.
FIG. 7 is a schematic diagram of the final control element from FIG. 5 in a second closed position.

In a first closed position 57, shown by way of example in FIG. 5, the valve body 56 abuts the first valve seat 58. The valve body 56 is subjected to a spring force by the spring element 60 in the direction of this first closed position 57.

In an intermediate position 59, shown in FIG. 6, the valve body 56 is lifted from the first valve seat 58 such that the valve body abuts neither the first valve seat 58 nor the second valve seat 62 and the valve 55 is therefore open. Meanwhile, in a second closed position 61, as shown for example in FIG. 7, the valve body 56 abuts a second valve seat 62. The flow cross section of the final control element 36 is thus blocked in the second closed position 61. The self-actuated valve 55 is installed in the recirculated air duct 26 in such a way that an inlet 64 of the valve 55 is connected to the vehicle interior 12 and an outlet 66 of the valve 55 leads into the surroundings.

If there is a low pressure difference, then the valve body 56 remains in the first closed position 57 on account of the spring force and thus closes the final control element 36. If the pressure in the vehicle interior 12 is increased, for example by increasing the fan output 15 of the fan 14, the valve body 56 lifts from the first valve seat 58 against the spring force of the spring element 60 such that air can escape from the vehicle interior 12 through the final control element 36. If the fan output 15 of the fan 14 increases further, the valve body 56 abuts the second valve seat 62 and closes the final control element 36 again such that no air can escape from the vehicle interior 12 through the final control element 36.

The surface area of the valve body 56 and the spring constant of the spring element 60 define a lower pressure difference limit, upon the exceeding of which the valve 55 transitions from the first closed position 57 to the intermediate position 59. This produces an opening threshold value for the fan output 15. An upper pressure difference limit is also defined at which the valve body 56 abuts the second valve seat 62 such that when the upper pressure difference limit is exceeded, the valve 55 closes again. This produces a closing threshold value for the fan output 15.

Using this specific embodiment of the final control element 36, the air quality mode can be activated and deactivated solely by means of the fan output 15 of the fan 14, and the actuator 38 can be omitted.

In the standard operation 50 of the vehicle air-conditioning system, the valve 55 is in the intermediate position 59. If the air quality mode 52 is then intended to be activated, the interior pressure 43 is increased, by increasing the fan output 15, to the extent that the valve 55 goes into the second closed position 61. Thereupon, the fan output 15 of the fan 14 can be decreased again without the interior pressure 43 in the vehicle interior 12 dropping too far. Even at a medium or low fan output 15 of the fan 14, the pressure difference applied to the valve 55 can be brought above the upper pressure difference limit such that the second closed position can be maintained.

If the air quality mode 52 is then intended to be deactivated, the fan output 15 of the fan 14 is reduced even further such that the interior pressure 43 in the vehicle interior 12 drops to the extent that the pressure difference at the valve 55 drops below the upper pressure difference limit and the final control element 36 thus opens again.

Apart from that, the third embodiment of the vehicle air-conditioning system 10 (shown in FIGS. 5 to 7) corresponds to the first embodiment of the vehicle air-conditioning system 10 (shown in FIGS. 1 to 3) in terms of design and function, to the above description of which reference is made in this respect.

The invention claimed is:

1. A vehicle air-conditioning system for ventilating a vehicle interior, comprising:
   a fan for propelling fresh air or recirculated air;
   a filter device for filtering and purifying at least the fresh air;
   an interior ventilation device, including a ventilation duct leading from the vehicle interior to vehicle surroundings, wherein the interior ventilation device is configured to conduct air out of the vehicle interior and to set an air quality mode in which fresh air and/or recirculated air is supplied to the vehicle interior;
   an air quality sensor for measuring at least one of: a particle density of particulate pollution, germ levels, ozone, $CO_2$, nitrogen oxides, and an oxygen content, of outside air as an outside air quality; and a final control element disposed within the ventilation duct downstream of the vehicle interior in a flow path of air conduction out of the vehicle interior, wherein the final control element is operated in an open and/or a closed-loop manner based on the sensed outside air quality so as to vary a flow resistance of the interior ventilation device and to thereby control an interior pressure of the vehicle interior to substantially achieve and maintain a target pressure independent of the fresh air supply, wherein the target pressure exceeds an ambient pressure.

2. The vehicle air-conditioning system according to claim 1, wherein the air quality mode is started and stopped automatically.

3. The vehicle air-conditioning system according to claim 1, wherein the air quality mode is started and stopped automatically depending on an outside air quality and wherein the outside air quality is measured by the air quality sensor and/or determined from a measurement value of a weather station and/or from a weather forecast.

4. The vehicle air-conditioning system according to claim 1, further comprising: a pressure sensor that measures the interior pressure in the vehicle interior.

* * * * *